United States Patent [19]

Fujiwara et al.

[11] Patent Number: 4,514,740

[45] Date of Patent: Apr. 30, 1985

[54] SHEET GUIDE MECHANISM IN A RECORDING DEVICE

[75] Inventors: Mitsugu Fujiwara; Yoshinori Sakaue, both of Morioka; Tomio Aso, Kitakami; Koshiro Kurokawa, Hanamaki; Hideo Obara, Ezuriko, all of Japan

[73] Assignee: Alps Electric Co., Ltd., Japan

[21] Appl. No.: 505,202

[22] Filed: Jun. 17, 1983

[30] Foreign Application Priority Data

Jun. 19, 1982 [JP] Japan ............................ 57-91802[U]

[51] Int. Cl.[3] .......................... G01D 15/16; B41J 3/04

[52] U.S. Cl. .................................. 346/139 R; 346/49; 346/136; 400/636.1; 400/643; 400/619

[58] Field of Search ..................... 346/49, 136, 139 R; 400/613.3, 619, 636, 636.1, 636.2, 636.3, 642, 643

[56] References Cited

U.S. PATENT DOCUMENTS 2,978,088 4/1961 Pearson et al. ................. 197/138 X
4,405,931 9/1983 Fujisawa ......................... 346/139 R

*Primary Examiner*—E. A. Goldberg
*Assistant Examiner*—Gerald E. Preston
*Attorney, Agent, or Firm*—Guy W. Shoup

[57] ABSTRACT

A sheet guide mechanism in a recording device including a rotatable platen and a recording member opposed to the platen, comprising pressure rollers adapted to come into pressure contact with the platen for pressing down a recording sheet, and a guide plate extending from a lower portion of a recording side of the platen in a direction opposite to the recording side past below the platen, the guide plate having windows formed therein for avoiding the pressure rollers and guide pieces formed on edges in a sheet inserting direction of the windows, the guide pieces being bent in a direction away from the platen.

4 Claims, 3 Drawing Figures

SHEET GUIDE MECHANISM IN A RECORDING DEVICE

BACKGROUND OF THE INVENTION

1. Field of the Invention

The present invention relates to a recording device such as a pen type recording device. Particularly, it is concerned with a sheet guide mechanism for conducting the fore end of a recording sheet smoothly onto a platen when setting the sheet.

2. Description of the Prior Art

In a pen type recording device, a recording sheet is wrapped around a platen and is fed by rotation of the platen. For wrapping and fixing the recording sheet onto the platen, pressure rollers are brought into pressure contact with the platen, and usually a guide plate is provided for conducting the fore end of the sheet up to the position where it is pressed by the pressure rollers when setting the sheet. Furthermore, for conducting the fore end of the sheet effectively, it is ideal that the guide plate extend from below the platen up to near the recording position. In this case, however, there occurs the necessity of providing the guide plate with windows for avoiding the pressure rollers, and the provision of such windows causes an inconvenience such that when setting the recording sheet the fore end of the sheet strikes against an edge of the window, thus making it impossible to insert the sheet smoothly.

SUMMARY OF THE INVENTION

The present invention has been effected in view of the above-mentioned problems, and it is the object thereof to provide a sheet guide mechanism in a recording device capable of preventing the fore end of a recording sheet from being caught by an edge of a window formed in a guide plate when inserting the sheet thereby permitting a smooth setting of the sheet.

In the present invention, windows for avoiding pressure rollers are formed in a guide plate extending from below a platen up to the lower portion of the recording side, and a guide piece bent in a direction away from the platen is provided at an edge in the sheet inserting direction of each window for preventing the fore end of a recording sheet from being caught by the said edge portion of the window.

An embodiment of the present invention will be described below with reference to the accompanying drawings.

DESCRIPTION OF A PREFERRED EMBODIMENT

Figure 1:
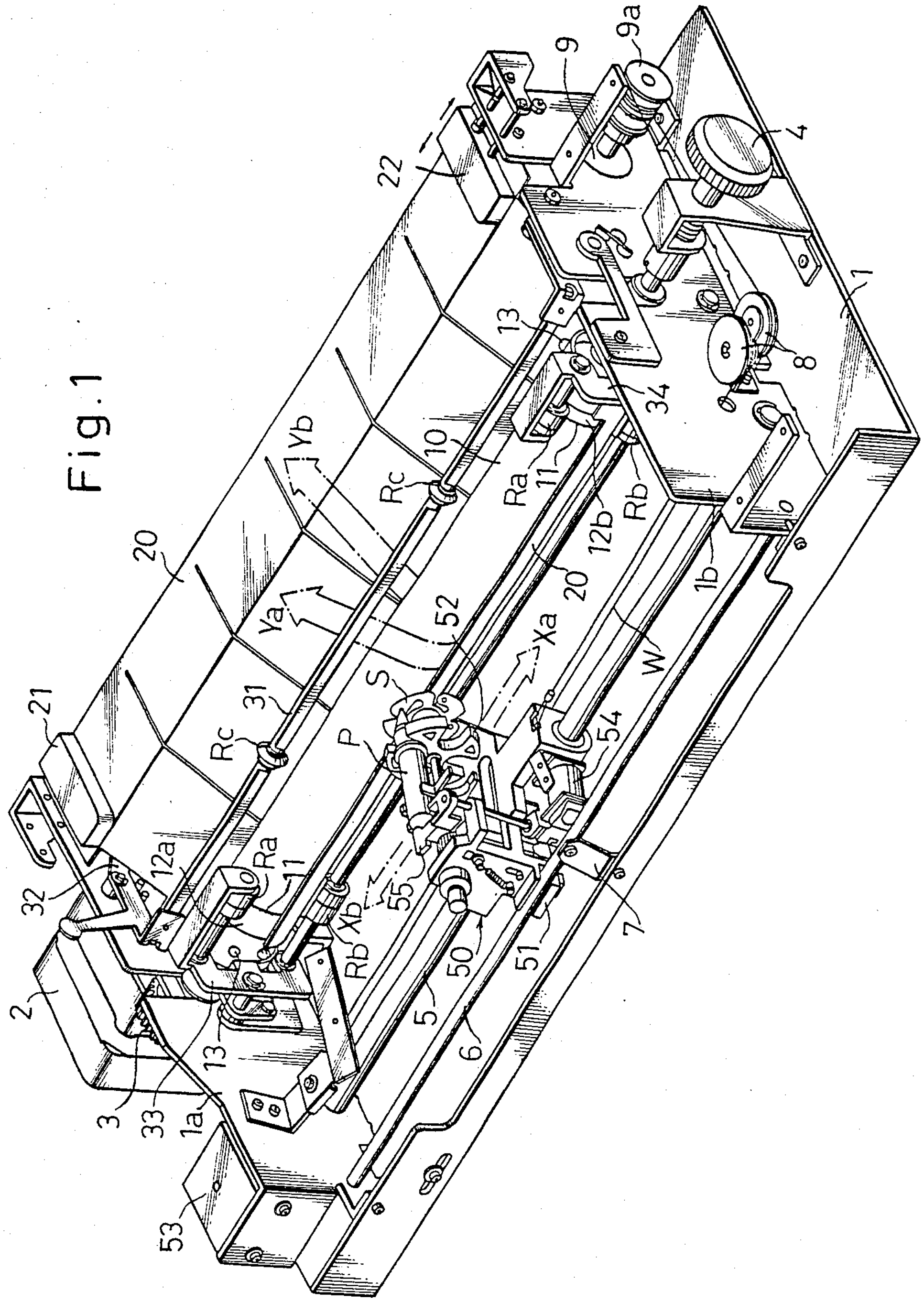
FIG. 1 is a perspective view of the entirety of a pen type recording device shown as an example of a recording device.

Referring to FIG. 1, there is shown a pen type recording device, in which a multi-color switching type pen P is moved in directions of arrows Xa and Xb, while a recording sheet (not shown in FIG. 1) is fed in directions of arrows Ya and Yb by means of a platen 10, and by controlling the movement in these X and Y directions there are described characters, figures and the like on the sheet. The platen 10 is rotated in the two directions through a gear 3 by virtue of a driving force of a stepping motor 2 mounted on a base 1. It can also be rotated manually by a handle 4. The recording sheet is inserted in the Ya direction from over a guide plate 20, on which are mounted a fixed positioning member 21 and a movable positioning member 22. In a position between both positioning members 21 and 22 the recording sheet is fed below the platen 10 while being guided at both side ends thereof by the positioning members 21 and 22. The movable positioning member 22 can be moved in directions of arrows according to sheet sizes such as A4 and B5 sizes. The sheet fed below the platen 10 is guided by the fore end of the guide plate 20 and reaches the recording side of the platen 10, where it is held between pressure rollers Ra, Rb each provided on both right and left sides and the platen 10. The upper end of the sheet further passes below sheet pressing rollers Rc which are positioned above the platen 10, and extends in the direction of arrow Ya. The sheet pressing rollers Rc are rotatably mounted on a sheet pressing shaft 31 which is disposed in parallel with the platen 10. The rollers Rc are for preventing an end portion in the Ya direction of the sheet under recording from being turned up in the direction of the pen P. The platen 10 is provided at both ends thereof with a toothed plate 11, to the outer end of which is connected a sprocket 13 integrally through short rollers 12*a* and 12*b*. The sprocket 13 is for fitting in small feed holes if the recording sheet has such holes formed in its side ends, whereby the sheet is fed in the Ya-Yb direction completely integrally with the platen 10. In case the sheet is a so-called letter paper not having such small feed holes, its side end portions are brought into pressure engagement with the toothed plate 11 and pressure rollers Ra, Rb. By the toothed plates 11 the letter paper is kept integral with the platen 10 and fed in the Ya-Yb direction. Thus, in the pen type recording device, the recording sheet is made integral with the platen 10 and the feed of the sheet and the rotation of the platen 10 are synchronized with each other whereby the recording accuracy can be improved. Because, when the pen P is moved in the Xa-Xb direction while the sheet is reciprocated at a long distance in the Ya-Yb direction for drawing a graph, a figure, or the like on the sheet, a slip may occur between the sheet and the platen 10 thereby causing a deviation in the feed of the sheet from the rotation of the platen 10, thus resulting in that the figure or the like drawn on the sheet is distorted.

When loading or positioning the sheet, it is necessary to disengage the pressure rollers Ra and Rb from the platen 10, and this operation is effected by lifting up the sheet pressing shaft 31. More specifically, left and right support members 33 and 34 for the pressure rollers Ra and Rb are adapted to move away from the platen 10 in interlock with a lifting motion of a pivotable lever 32 which supports the sheet pressing shaft 31.

The pen P is carried on a pen carriage 50. The pen carriage 50 is adapted to move in the Xa-Xb direction on a main shaft 5 extending between both side plates 1*a* and 1*b* which are mounted on the base 1. It is formed at its rear portion with a guide groove 51 for sliding on an auxiliary shaft 6 extending between the side plates 1*a* and 1*b*. The angle of the pen carriage 50 relative to the platen 10 is decided while being supported by the main shaft 5 and auxiliary shaft 6. In the figure, the pen carriage 50 is inclined so that the tip end of the pen P faces downward. This is for improving the flow of ink within the pen P.

Because the supporting span at both ends of the auxiliary shaft 6 is long, a central portion of the auxiliary shaft 6 is fixed onto the base 1 through a strut 7, whereby the main shaft 5 and the auxiliary shaft 6 are held in an exact parallelism, and the angle of the pen P relative to the platen 10 is kept constant while the pen carriage 50 move in the Xa-Xb direction.

The movement of the pen carriage 50 in the Xa-Xb direction is effected by being pulled with a wire W. The wire W is engaged with pulleys 8 mounted outside each of the side plates la and lb and then wound around a pulley 9*a* of a stepping motor 9 which is mounted below the guide plate 20. By forward and reverse rotation of the stepping motor 9 the pen carriage 50 is pulled by the wire W in the Xa-Xb direction.

Four pens P can be held by a holder 52 on the pen carriage 50 (only one pen P is shown in FIG. 1). The holder 52 is rotatable on the pend carriage 50 and this rotation is effected by a solenoid 53 mounted outside the side plate 1*a*. More specifically, the main shaft 5 rotates at a predetermined angle by virtue of attraction of the solenoid 53 and this rotating force of the main shaft 5, whose section is in the form of a broken-off circle, is transmitted to a ratchet mechanism within the pen carriage 50 whereby the holder 52 is rotated thereby allowing a desired pen P to reach a recording position (the uppermost position). The pen P is held in a retreated position relative to the platen 10 by being pushed with a return leaf spring S. In this state, when a hammer 55 is driven by a solenoid 54 mounted on the pen carriage 50, the tip end of the pen P in the recording position is pushed by the hammer 55 and thereby comes into pressure contact with the platen 10.

More particularly, one of the four pens P, having a desired color, is shifted to the uppermost position and then the pen carriage 50 is moved in the Xa-Xb direction by the stepping motor 9, while the recording sheet is moved in the Ya-Yb direction by the stepping motor 2 while being held between the platen 10 and the pressure rollers Ra, Rb. And by pushing the pen P with the hammer 55 to bring its tip end into pressure contact with the sheet, there are described on the sheet characters, figures, graphs or the like according to motions in the X and Y directions.

The following description is now provided about the construction of the sheet guide mechanism according to the present invention.

Figure 3:
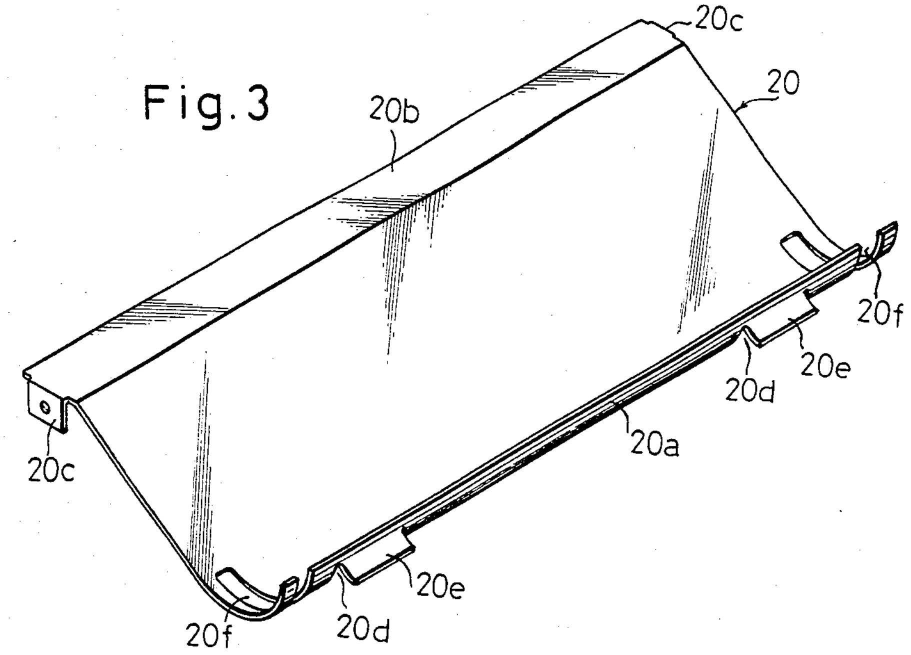
FIG. 3 is a perspective view of a guide plate.

The guide plate 20 is formed of a sheet metal and, as shown in FIG. 3, a fore end portion 20*a* is curved concentrically with the platen 10, while a rear end portion 20*b* is formed as a plane at a higher position. Formed on both sides of the rear end portion 20*b* are bent mounting pieces 20*c*, which are fixed with screws to the inner surfaces of the paired side plates 1*a* and 1*b* on the base 1. A pair of windows 20*d* are formed in the fore end portion of the guide plate 20 for avoiding the pressure contact portions of the lower pressure rollers Rb. Further, a guide piece 20*e* is provided on the edge in the sheet inserting direction of each window 20*d*, namely, the edge in the fore end direction of the guide plate 20. The guide piece 20*e* is formed by bending part of the guide plate 20 curvilinearly in a direction away from the platen 10. Moreover, on both sides of the windows 20*d* are formed notches 20*f* extending in the circumferential direction of the platen 10. These notches 20*f* are for avoiding the pawls of the sproket 13 disposed on both sides of the platen 10.

Figure 2:
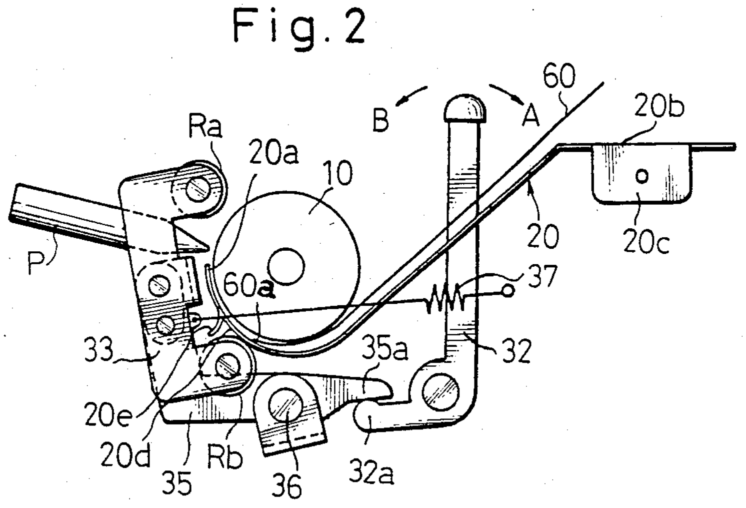
FIG. 2 is a side view of a sheet guide mechanism embodying the invention.

As shown in FIG. 2, the support member 33 for supporting the support shafts of the pressure rollers Ra and Rb is integral with a pivotable plate 35 which is pivotably mounted on a pivot pin 36 on the side plate 1*a*. The other support member 34 which also supports the pressure rollers Ra and Rb is also integral with a pivotable plate (the same plate as 35) which is attached pivotably to the inner surface of the other side plate 1*b*. The support members 33 and 34 are each pulled toward the platen by means of a spring 37, and the pressure rollers Ra and Rb are each brought into pressure contact with the platen 10 by virtue of this spring pressure. Further, the pivotable lever 32 is provided at its lower part with a pressure portion 32*a*, which is opposed to the underside of a pawl portion 35*a* of the pivotable plate 35. The pivotable plate integral with the other support member 34 is also provided with the same pawl portion as 35*a*, under which is disposed a pressure portion (same as 32*a*) adapted to move together with the pivotable lever 32. A sheet pressing shaft 31 is supported by the pivotable lever 32 as shown in FIG. 1, but in FIG. 2 the pivotable lever 32 is shown in a simplified manner.

The following description is now provided about the function and effect of the present invention having the above-described construction.

For setting recording sheet 60 onto the platen 10, first the pivotable lever 32 is turned in the direction of arrow A to push the pawl portion 35*a* of the pivotable plate 35 through the pressure portion 32*a* of the pivotable lever 32 to thereby move the support member 33 (34) and the pivotable plate 35 to move pivotally in a counterclockwise direction, whereby the pressure rollers Ra and Rb are disenaged from the platen 10. In this state, a fore end 60*a* of the recording sheet 60 is inserted from the rear portion 20*b* side of the guide plate 20. The fore end 60*a* of the sheet 60 slides on the upper surface of the guide plate 20 and advances to the recording side. At this time, it strikes against the edges in the sheet inserting direction of the windows 20*d* of the guide plate 20, but since the guide pieces 20*e* are provided on those window edges, the fore end 60*a* of the sheet strikes on the guide pieces 20*e* and moves smoothly toward the pen P without being caught by the window edges. After the fore end 60*a* of the sheet 60 passed below the upper pressure rollers Ra, the pivotable lever 32 is turned in the direction of arrow B to release the pawl portion 35*a* from its restraint, whereby the pressure rollers Ra and Rb are brought into pressure contact with the platen 10 by virtue of the spring 37, so that the recording sheet 60 is wrapped round and fixed to the platen 10.

Although pen P is shown as a recording member in the illustrated embodiment, the present invention is applicable also to various recording devices provided with other recording members than pen P, for example, a type drum and a dot gun.

According to the present invention, as described hereinabove, windows for avoiding pressure rollers are formed in the guide plate, and guide pieces are provided on the window edges in the sheet inserting direction, so that when setting a recording sheet onto the guide plate, the sheet can be inserted smoothly without being caught at its fore end by such window edges, thereby facilitating the wrapping and fixing operation for the sheet with respect to the platen. Moreover, the guide pieces can be formed easily by merely bending part of the guide plate in a direction away from the platen.

Furthermore, since the provision of the pressure roller avoiding windows permits the front portion of the guide plate to be extended up to a position close to a recording member, it is possible to conduct the sheet exactly up to such position close to the recording member.

What is claimed is:

1. A sheet guide mechanism in a recording device including a rotatable platen having an inlet side for a recording sheet, a recording member opposed to a recording side of the platen, and pressure rollers adapted to come into pressure contact with said platen for pressing down a recording sheet, wherein said guide mechanism comprises a guide plate extending from said inlet side to a lower portion of said recording side of said platen below said platen, said guide plate having windows formed therein for bringing said pressure rollers into contact with said platen and recording sheet, and guide pieces formed on forward edges of said windows for guiding the recording sheet around said platen in a sheet inserting direction of said windows, said guide pieces being bent in a direction away from said platen.

2. A sheet guide mechanism in a recording device according to claim 1, wherein said pressure rollers are each attached to a support member, said support member being urged to said platen side at all times by means of a spring member.

3. A sheet guide mechanism in a recording device according to claim 1, characterized by further including a lever member capable of moving said pressure rollers between a position where said pressure rollers abut said platen and a position where said pressure rollers are spaced from said platen.

4. A sheet guide mechanism in a recording device according to claim 1, wherein said guide pieces are formed in a tongue shape by bending portions of said guide plate from said forward edges of said windows curving away from said platen.

* * * * *